United States Patent
Robrecht et al.

(10) Patent No.: US 8,770,520 B2
(45) Date of Patent: Jul. 8, 2014

(54) DEVICE FOR THE MOUNTING OF CONNECTORS

(75) Inventors: Volker Robrecht, Hamburg (DE); Till Raguse, Hamburg (DE); Daniel Stoevesand, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 304 days.

(21) Appl. No.: 13/195,101

(22) Filed: Aug. 1, 2011

(65) Prior Publication Data

US 2012/0025024 A1 Feb. 2, 2012

Related U.S. Application Data

(60) Provisional application No. 61/369,082, filed on Jul. 30, 2010.

(30) Foreign Application Priority Data

Jul. 30, 2010 (DE) .......................... 10 2010 038 695

(51) Int. Cl.
*B64C 1/06* (2006.01)

(52) U.S. Cl.
USPC .......................................... 244/131; 244/119

(58) Field of Classification Search
USPC ........... 244/119, 123.1, 123.14, 123.2, 123.8, 244/123.9, 131, 132
See application file for complete search history.

(56) References Cited

U.S. PATENT DOCUMENTS

| | | | |
|---|---|---|---|
| 6,086,415 A | 7/2000 | Sanchez et al. | |
| 2006/0226288 A1* | 10/2006 | Vetillard et al. | 244/119 |
| 2008/0296443 A1 | 12/2008 | Lunitz et al. | |

FOREIGN PATENT DOCUMENTS

| | | |
|---|---|---|
| DE | 3809940 A1 | 10/1989 |
| DE | 102007060030 A1 | 12/2008 |

* cited by examiner

*Primary Examiner* — Timothy D Collins
*Assistant Examiner* — Nicholas McFall
(74) *Attorney, Agent, or Firm* — Leydig, Voit & Mayer, Ltd.

(57) ABSTRACT

A device for mounting at least one connector in an aircraft fuselage includes a first and a second traverse configured to connect the device to a structural section of the aircraft fuselage at end sections of the first and second traverses. A frame element extends transversely between the first and the second traverses and is configured to accommodate the at least one connector. A first and a second connecting profile respectively connect the frame element to the first and second traverse.

9 Claims, 7 Drawing Sheets

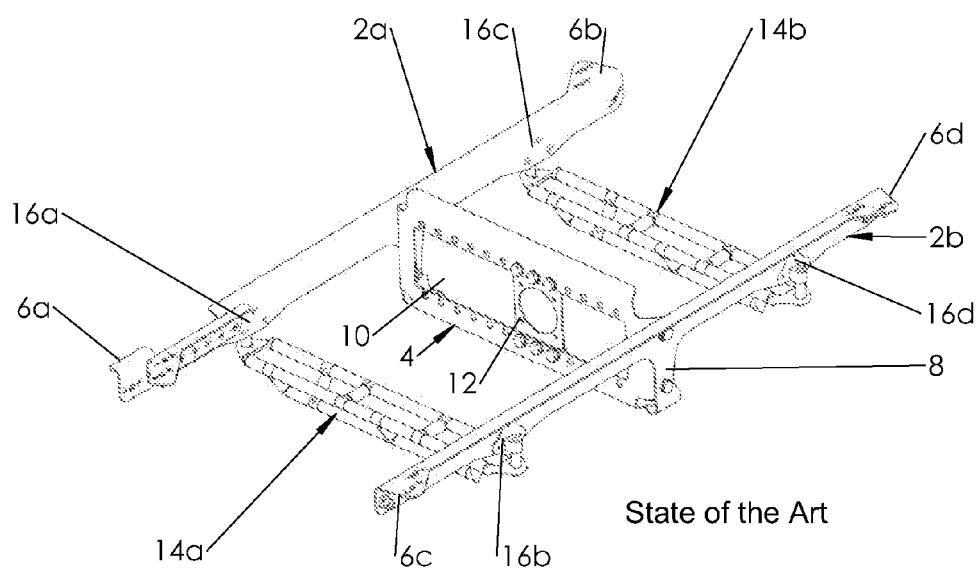
Fig. 1 State of the Art
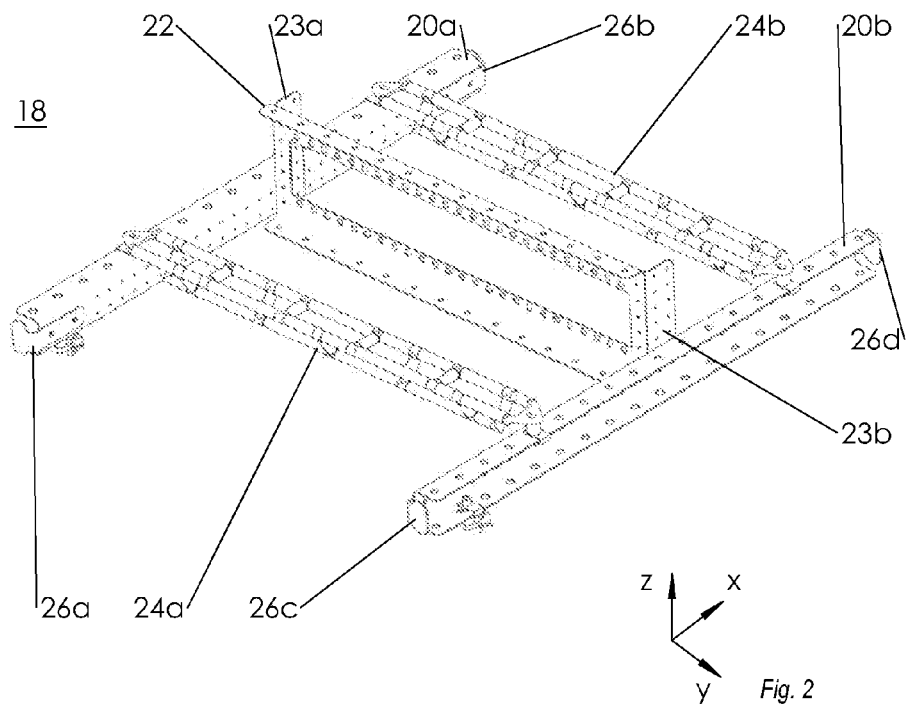
Fig. 2

US 8,770,520 B2

DEVICE FOR THE MOUNTING OF CONNECTORS

CROSS REFERENCE TO PRIOR APPLICATIONS

Priority is claimed to German Patent Application No. DE 10 2010 038 695.2, filed Jul. 30, 2010 and U.S. Provisional Application No. 61/369,082, filed Jul. 30, 2010. The entire disclosure of both applications is incorporated by reference herein.

FIELD

The invention relates to a device for the mounting of connectors, in particular in an aircraft fuselage.

BACKGROUND

An aircraft or spacecraft, for example a passenger aircraft, requires a multitude of electrical lines and a correspondingly large number of electrical connectors for connecting the lines. In particular for reducing component diversity and installation effort, and thus for reducing costs, in recent times modular mounting systems to bind or route the lines have been used with increased frequency, which modular mounting systems can be individually adjusted. Such a system is, for example, described in DE 10 2007 060 030 A1 by this applicant. This system comprises a traverse, which can be put together in a puzzle-like manner, for connecting the mounting system to sections of a primary structure and to line holders for accommodating the lines. The traverse comprises a multitude of members of the same kind, with some of them comprising a body section for attaching the line holders. The length of the traverse is adjusted as required by way of the number of members. The position of the line holders is varied by way of the position of the corresponding members in the traverse.

FIG. 1 shows a device for the mounting of connectors. The device 1 has two parallel traverses 2a, 2b that are spaced apart from one another by way of a frame element 4. The traverses 2a, 2b are arranged between cross members and are connected with the aforesaid by way of connecting plates 6a, 6b, 6c, 6d that are flange-mounted on the ends or that form an integral part. At its ends the frame element 4 is connected to the traverses 2a, 2b by way of a middle traverse section 8, with said frame element 4 comprising a recess 10 for accommodating a plurality of inserts 12 for arranging the connectors. In each case a lateral traverse 14a, 14b is arranged on the sides of the frame element 4, which lateral traverse 14a, 14b extends between the traverses 2a, 2b and in each case is connected to a console 16a, 16b, 16c, 16d of the traverses 2a, 2b. This solution is associated with a disadvantage in that it is only suitable for a particular installation position in the aircraft, or for a particular route, and can thus not be used for different routes or positions of connectors, because relative positions, e.g. of the lateral traverses 14a, 14b, are given. This results in great component diversity, because a dedicated device needs to be developed in relation to each connector position or interface between routes. This results in correspondingly very substantial development expenditure as well as high production costs because of the small position quantities involved. Furthermore, the individualised devices in each case result in very considerable maintenance and repair expenditure. Moreover, this device does not support the connection of further routes or systems, for example routes or systems that cross the device.

A device for the mounting of connectors with a reduced component diversity is, for example, described in DE 38 09 940 A1. In this modular device, inserts for accommodating the connectors, or the connectors themselves, are in each case positioned between two studs, and are connected to the primary structure by way of a traverse on which the foot sections of the studs are supported. The studs identically comprise a uniform height and are slidably guided in the traverse so that inserts of various sizes can be used. The maximum size of the inserts is determined by the stud height. At the head end the studs are braced together by means of a cable tie. This device makes it possible to slide the connectors in longitudinal direction of the traverse, and also makes it possible to provide almost any number of inserts or connectors; however, a comparatively large number of studs are necessary, and consequently not only is the installation expensive, but the overall weight of the device is comparatively heavy. Furthermore, depending on the size of the inserts, the connector axes are arranged at different spacing from the traverse. Moreover, in the case of damage to the cable tie, the inserts are no longer adequately secured. In addition, this device is, for example, unable to compensate for steps in the primary structure.

SUMMARY OF THE INVENTION

In an embodiment, the present invention provides a device for mounting at least one connector in an aircraft fuselage. The device includes a first and second traverse configured to connect the device to a structural section of the aircraft fuselage at end sections of the first and second traverses. A frame element extends traversely between the first and second traverses and is configured to accommodate the at least one connector. A first and a second connecting profile respectively connect the frame element to the first and second traverse.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 shows a perspective top view of a prior art device for the mounting of connectors, FIG. 2 shows a perspective top view of a device according to an embodiment of the present invention for the mounting of connectors.

DETAILED DESCRIPTION

Figure 3:
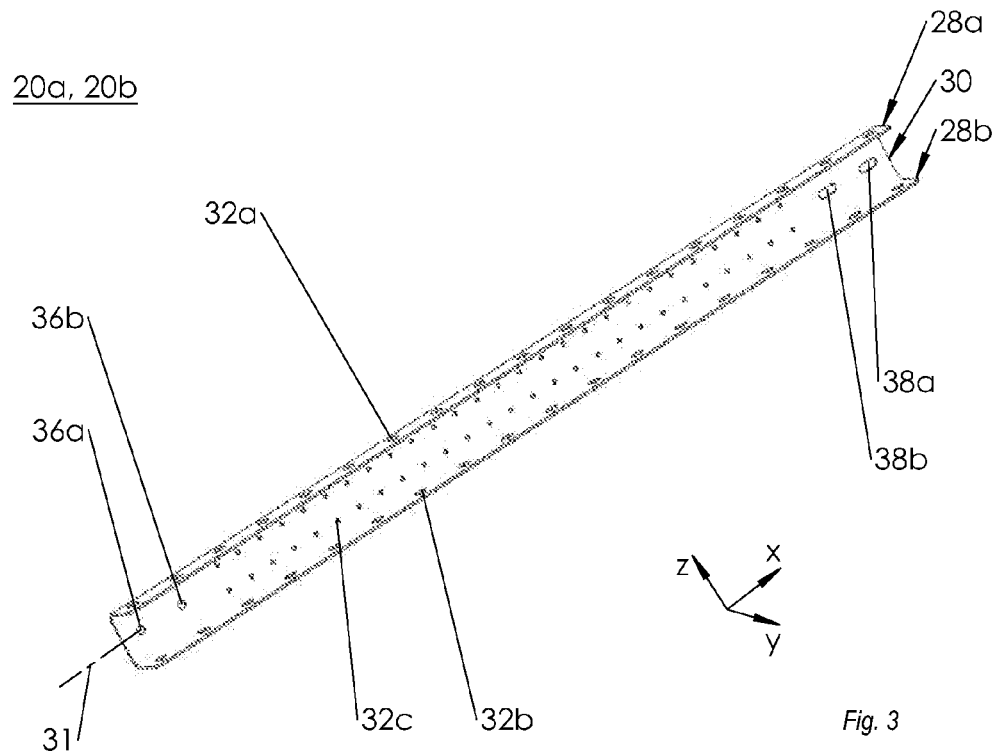
FIGS. 3 to 8 show components for manufacturing the device according to the embodiment of FIG. 2, and FIGS. 9 to 14 show exemplary adjustment options of the device according to an embodiment of the present invention.

It is an aspect of the present invention to create a device for the mounting of connectors, in particular in an aircraft fuselage, which device overcomes the above-mentioned disadvantages and makes possible quick adjustment in the case of highly complex installation space requirements, for example in the case of an altered installation space geometry, or an altered route.

A device according to an embodiment of the present invention for the mounting of connectors comprises two traverses for connecting the device, on the ends, to structural sections, for example of an aircraft fuselage, and comprises a frame element for accommodating at least one connector, which frame element extends transversely between the traverses and is connected to said traverses. According to the invention, connecting profiles for movably connecting the frame element to the traverses are provided. The connecting profiles create degrees of freedom that make it possible to flexibly arrange the frame element at least in vertical direction and in longitudinal direction of the device relative to the traverses. Likewise, the connecting profiles make it possible to position the frame element at an angle to the traverses. In particular, the traverses can be individually moved relative to one another in vertical direction; they thus need not be positioned in one plane for the frame element to be connected, so that steps in the primary structure can be compensated for. In this arrangement it is particularly advantageous if the components such as the frame element, traverses and connecting profiles are of a modular design and thus standardised, so that as a result of the modularity or standardisation a high degree of flexibility of the device is achieved while the component diversity is reduced. In this way it is possible to react in a flexible manner to changed design space geometries with adjusted routing or connector positions and systems. The modular design of the components results in component standardisation so that not only is the diversity of individual components significantly limited, but also the design of the device is simplified to the extent that components such as traverses and frame elements can be selected from a parts catalogue. Likewise, component standardisation reduces production expenditure and thus production costs, because the components can be produced in large numbers. Such component standardisation results in further advantages in business operations, for example in reduced control expenditure, reduced lead time in parts release, and a reduction in fault tolerance. Moreover, reduced component diversity is associated with easier inventory management, which is beneficial to materials planning. Furthermore, repair and maintenance procedures can be standardised and pre-assembly work can be carried out.

In an embodiment, the device according to the invention can be used not only in aircraft and spacecraft but also in ships and boats, trains and the like. In principle the device can be used wherever connectors are to be placed between two spaced-apart structural elements or structural sections such as webs, flanges, stiffeners, for example cross members and longitudinal members and the like.

In a preferred exemplary embodiment the traverses, the frame element and the connecting profiles comprise perforation patterns for accommodating attachment means such as rivets, bolts and the like. The perforation patterns make it possible to establish safe positioning, and with corresponding hole spacing or a corresponding pitch almost infinitely variable positioning of the frame element on the traverses becomes possible. In this arrangement the respective perforation pattern meets minimum static requirements so that despite the weakening of the material as a result of the respective perforation pattern adequate stability of the respective component is ensured.

Preferably, the traverses are designed as C-profiles with a web and two flanges, wherein both the web and the flanges each comprise a perforation pattern. The C-profile results in very considerable stability of the traverses, so that in combination with the perforation patterns, which essentially extend along the entire traverse, apart from the frame element other routes or systems can be attached to the traverses.

For the purpose of connecting the traverses to the primary structure, for example to cross members, at least one end section of the traverses can comprise elongated holes for accommodating attachment means that basically make it possible to compensate for component tolerances or installation tolerances of the traverses, as well as of the structural sections such as cross members.

In an embodiment, the frame element preferably comprises at least one standard connecting region for accommodating the connectors. For the purpose of connecting further or other components, such as a roof element that serves as a device to protect against water, in one exemplary embodiment a standard connecting region is designed as a flange that comprises a perforation pattern, as a result of which the roof element can be connected as desired in transverse direction of the frame element, and can be of a correspondingly shortened design.

The connecting profiles can be produced in a particularly simple and cost-effective manner if they are designed in an L-shaped manner with two limbs and if they engage edge regions of the frame element that are spaced apart from one another, and if they further engage the web of the traverses. As a result of the angular geometry of the connecting profiles, likewise the production of the frame element is simplified because the edge regions of the frame elements thus need not be subjected to a deformation process, for example to bevelling, but instead the design of plane, non-angled edge regions for connection of the connecting profiles is sufficient.

In an exemplary embodiment, on the side of the frame element at least one lateral traverse is arranged so as to be movable in longitudinal direction of the traverses. However, preferably two lateral traverses are provided which laterally flank the frame element. The lateral traverses are, in particular, used to form loops for draining condensed water; as a result of their ability to move in longitudinal direction they can be positioned at variable spacing from the frame element so that displacement of the frame element in the direction of the vertical axis of the device can be compensated for, and thus prescribed route radii can be maintained.

Preferably, the lateral traverses are each connected to a flange of the traverses and are operatively connected to the respective perforation pattern. In this arrangement the connection of the lateral traverses can take place by way of integrated engagement pins or by way of separate attachment means.

In a preferred exemplary embodiment the traverses, the frame element, the connecting profiles and/or the lateral traverses are in each case designed so as to be symmetrical in relation to one of their body axes. Consequently the component diversity is further reduced, and in particular installation is facilitated, because, for example, each traverse and each connecting profile can assume the position and task of the respectively other traverse or of the other connecting profile.

In order to achieve optimal electrical conductance of the device it is advantageous if the traverses, the frame element and the connecting profiles are metallic, and in particular for reasons of weight reduction comprise a light metal or a light metal alloy. The design involving metal also facilitates production, because the components can thus be edge profiles.

In an embodiment, the lateral traverses preferably comprise a plastic material or a plastic alloy, for example polyether ether ketone (PEEK). The plastic acts as an insulator between the routes leading to the connectors, and prevents any electrical or signal-related short circuit in the region of the lateral traverses in the case of the cable insulation chafing through.

As shown in FIG. 2, a modular device 18 according to the invention for the mounting of connectors, for example in an aircraft fuselage, comprises two traverses 20a, 20b that extend parallel to one another; a frame element 22 that extends in transverse direction between the traverses 20a, 20b; two connecting profiles 23a, 23b for connecting the frame element 22 to the traverses 20a, 20b; two lateral traverses 24a, 24b that extend between the traverses 20a, 20b, wherein in each case a lateral traverse 24a, 24b is arranged on the side of the frame element 22; and four angle profiles 26a, 26b, 26c, 26d for connecting the traverses 20a, 20b, for example to parallel-extending sections of a primary structure such as cross members of the aircraft fuselage. For joining the individual components 20a, 20b, 22a, 23a, 23, 23b, 24a, 24b, 26a, 26b, 26c, 26d to the device 18, preferably attachment means such as rivets, bolts or pins are used.

Figure 4:
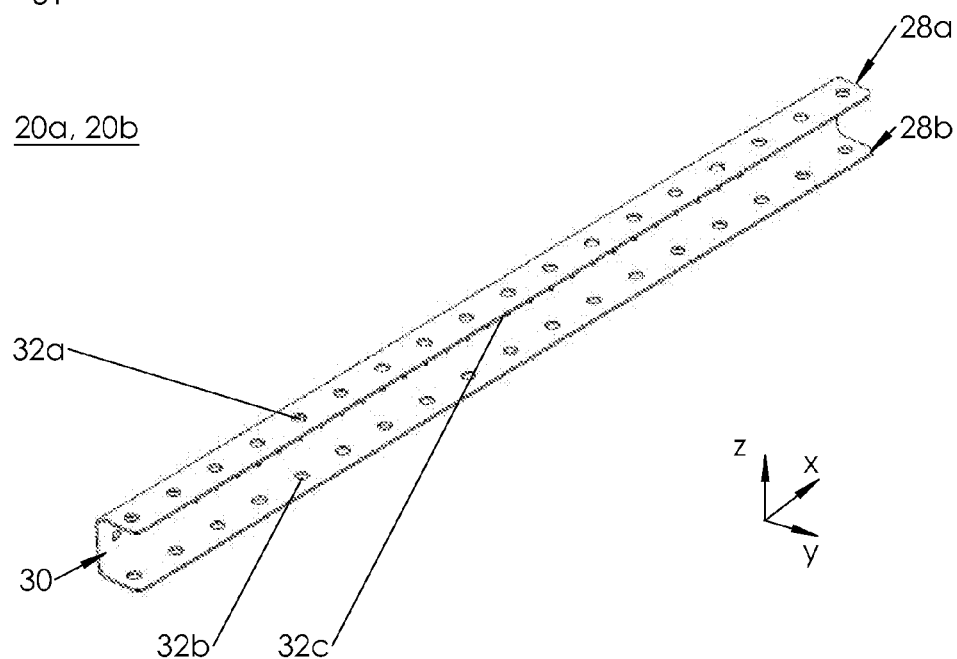

According to FIGS. 3 and 4 each of the traverses 20a, 20b comprises a C-shaped profile with two flanges 28a, 28b that are connected to one another by way of a web 30. The traverses 20a, 20b have a symmetry axis 31 that extends in longitudinal direction x; they preferably comprise a metallic base material. In each case the flanges 28a, 28b, which are preferably made in a bevelling process, and the web 30 comprise a perforation pattern 32a, 32b, 32c.

Figure 10:
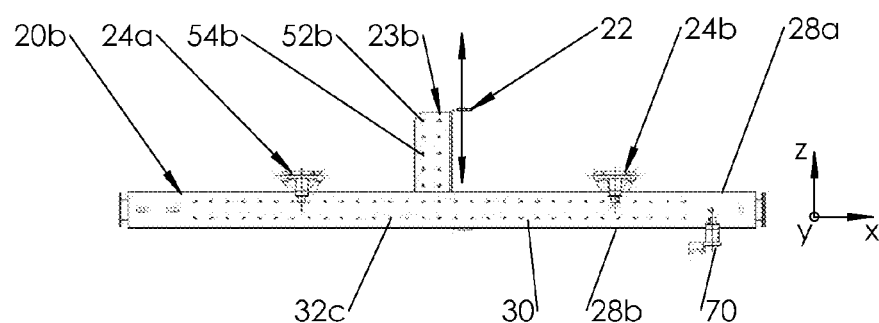
Figure 11:
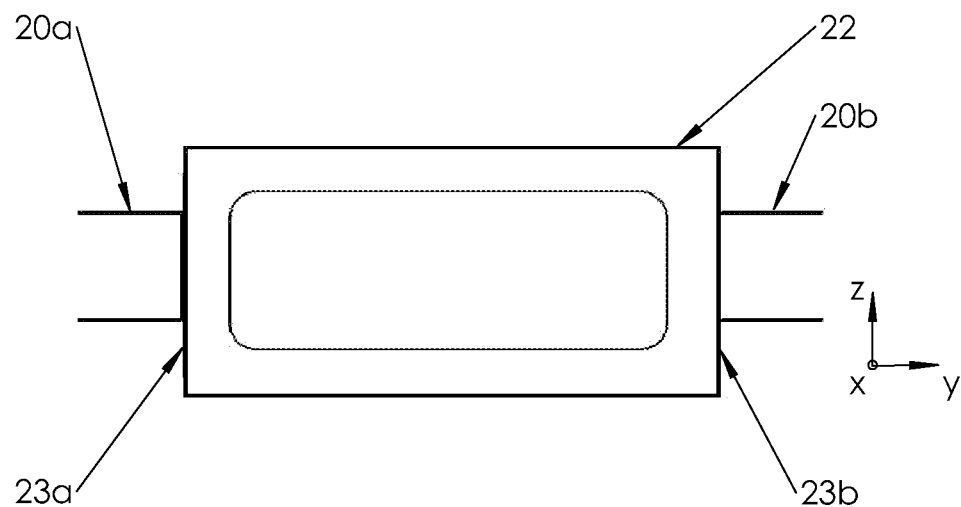
Figure 12:
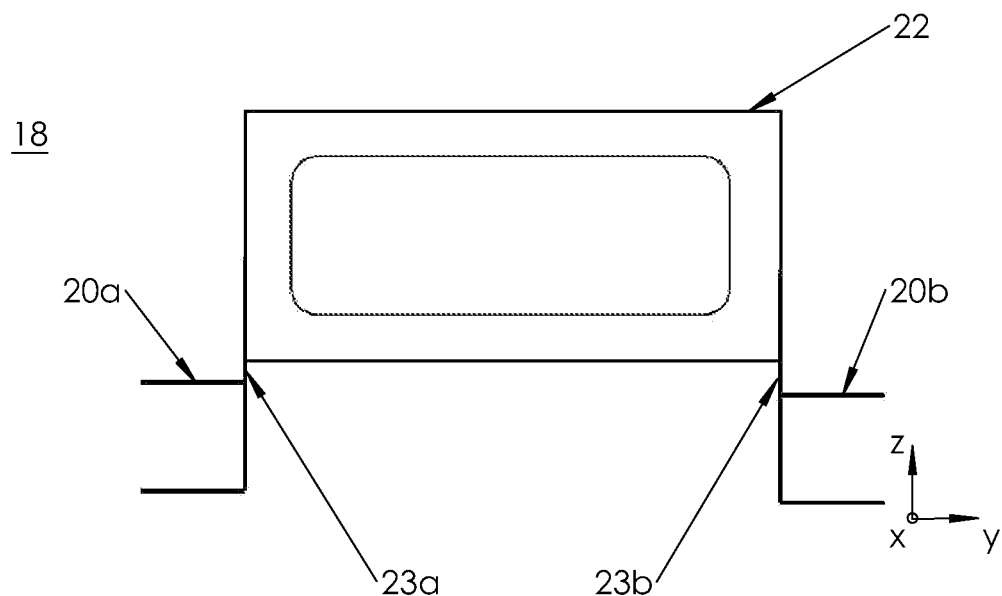
Figure 13:
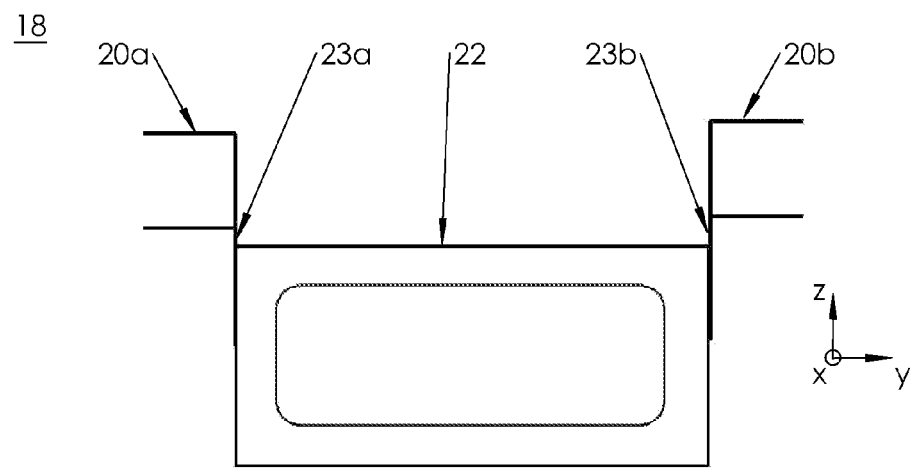

The perforation patterns 32a, 32b in the flanges 28a, 28b are identical; they are used for connecting the lateral traverses 24a, 24b or further system supports 70 shown in FIG. 10. They comprise a multitude of holes, arranged equidistantly in longitudinal direction x one beside the other.

The perforation pattern 32c in the web 30 is used to connect the connecting profiles 23a, 23b of the frame element 22; it has two parallel hole lines comprising a multitude of holes equidistantly spaced apart from one another in longitudinal direction x.

In an end section of the web 30, which according to the illustration is the left-hand end section, two holes 36a, 36b are provided, which at the height of the symmetry axis 31 of the traverses 20a, 20b are positioned side by side, for connecting one of the angle profiles 26a, 26b, 26c, 26d. To compensate for component tolerances and installation tolerances of the traverses 20a, 20b or of the primary structure carrying the traverses 20a, 20b, in an end section, which according to the illustration is the right-hand end section, of the web 30 at the height of the symmetry axis 31 in each case there are two elongated holes 38a, 38b, positioned beside one another, through which corresponding attachment means for attaching one of the angle profiles 26a, 26b, 26c, 26d can be fed.

Figure 5:
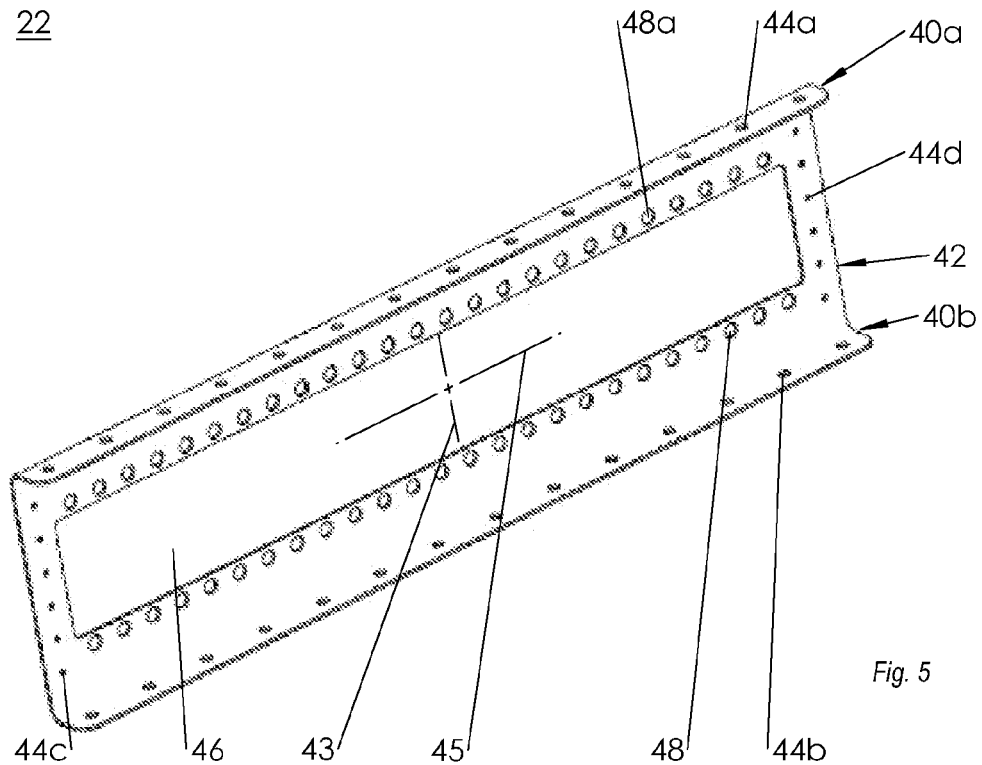

The frame element 22 is used to accommodate connectors or connector inserts. According to FIG. 5, said frame element 22 has a C-shaped profile with two flanges 40a, 40b that are connected to one another by way of a web 42. The frame element 22 is designed so as to be symmetrical to its longitudinal axis 43 and vertical axis 45, and preferably comprises metal. The flanges 40a, 40b are, for example, made by means of a bevelling process.

The frame element 22 comprises four perforation patterns 44a, 44b, 44c, 44d, in each case one perforation pattern 44a, 44b being located in the flanges 40a, 40b, and one perforation pattern 44c, 44d being located in edge regions of the web 42, which edge regions extend between the flanges 40a, 40b. In each case the perforation patterns 44a, 44b on the flange side, and the perforation patterns 44c, 44d on the web side are identical in their design.

Figure 8:
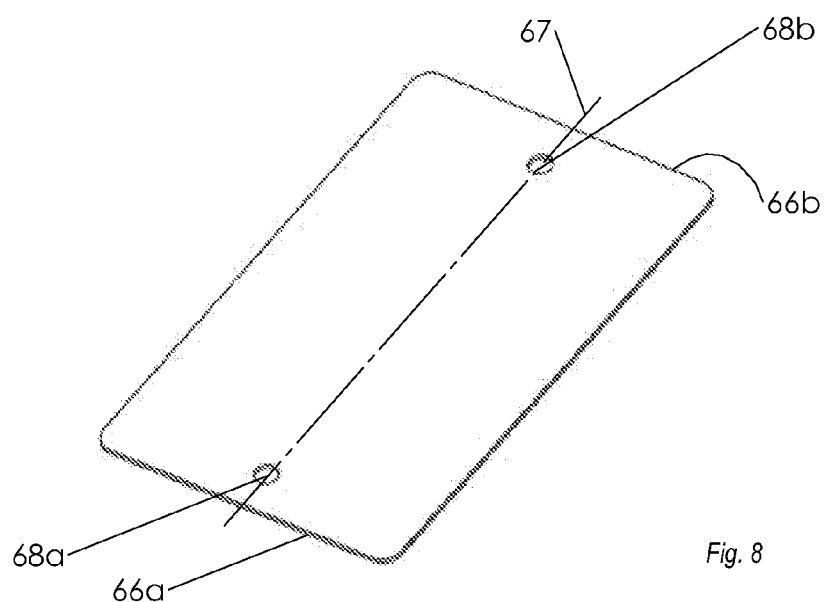

The perforation patterns 44a, 44b on the flange side, which perforation patterns 44a, 44b in the exemplary embodiment shown are in each case formed by an even hole line that extends along the longitudinal axis 43, are used for connecting further components, for example a roof element 64, shown in FIG. 8. The perforation patterns 44c, 44d on the web side are used for connecting the connecting profiles 23a, 23b.

For accommodating the connectors or the connector inserts, the frame element 22 comprises a rectangular recess 46 that in the direction of the longitudinal axis 43 and thus parallel to the flanges 40a, 40b is in each case flanked by a hole line 48a, 48b. The recess 46 and the hole lines 48a, 48b provide standard connecting regions for the connectors or for their inserts, thus making it possible to arrange the connector axes in one plane.

Figure 6:
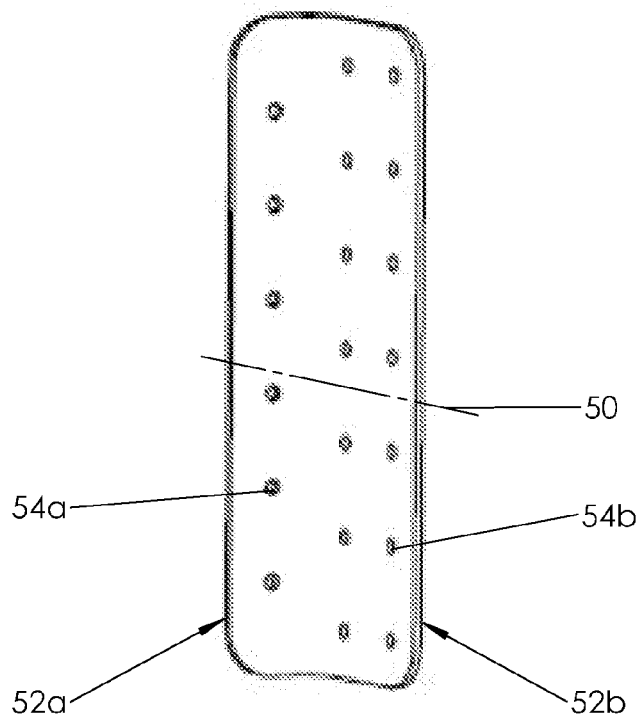

According to FIG. 6, the connecting profiles 23a, 23b in each case comprise an L-shaped design with two limbs 52a, 52b that are arranged at right angles relative to one another. They are designed so as to be symmetrical to their transverse axis 50 and they preferably comprise a metallic material so that the limbs 52a, 52b can easily be positioned against one another by way of a bevelling process. The limbs 52a, 52b comprise various widths, with each limb comprising a perforation pattern 54a, 54b.

The perforation pattern 54a in the narrow limb 52a is used for connecting the connecting profiles 23a, 23b to the frame element 22. Correspondingly, the perforation pattern 54a is identical to the web-side perforation pattern 44c, 44d of the frame element 22; it comprises a line of holes that are equidistantly spaced apart from one another. In order to prevent the narrow limb 52a from projecting into the recess 46 of the frame element 22, said limb 52a comprises a width that corresponds to the edge region of the web 42.

The perforation pattern 54b in the wide limb 52b, by means of which perforation pattern 54b the connecting profiles 23a, 23b are attached to the traverses 20a, 20b, is designed according to the web-side perforation pattern 32c of the traverses 20a, 20b. The perforation pattern 54b comprises two hole lines that extend parallel and side by side in vertical direction z, with their hole distance in vertical direction z and in transverse direction y or 50 corresponds to the distance between the holes of the web-side perforation pattern 30c of the traverses 20a, 20b.

Figure 7:
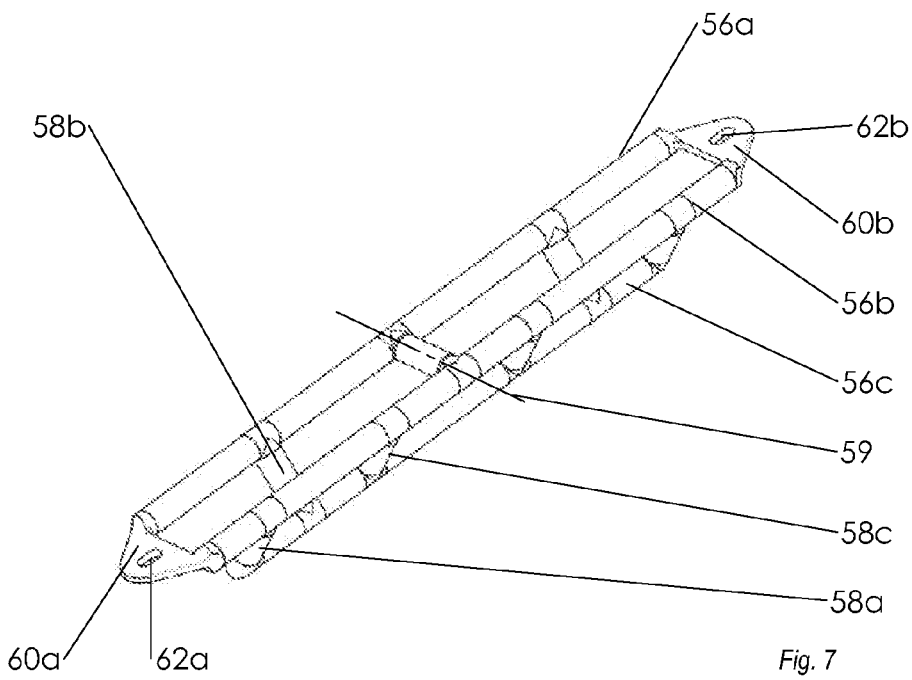

According to FIG. 7 the lateral traverses 24a, 24b comprise three rod-shaped elements 56a, 56b, 56c that form a triangular cross-sectional area, which rod-shaped elements 56a, 56b, 56c are connected to one another by way of a multitude of webs 58a, 58b, 58c, . . . . Two of the rod-shaped elements 56a, 56b are longer than the third rod-shaped element 56c and at the ends are connected to one another in each case by way of an area-shaped connecting element or a lug 60a, 60b that is used for connection to the traverses 20a, 20b. The lateral traverses 24a, 24b are designed so as to be symmetrical relative to their transverse axis 59; they comprise a plastic material or a plastic alloy, for example PEEK, and are used, in particular, to form loops for draining condensed water from the routes. They are movably attached to the flanges 28a, 28b of the traverses 20a, 20b; and for the purpose of compensating for component tolerances and installation tolerances each of their lugs 60a, 60b comprises an elongated hole 62a, 62b for accommodating a corresponding attachment means.

FIG. 8 shows an exemplary roof element 64 that provides condensed-water draining protection for the connectors accommodated in the frame element 22. The roof element 64 comprises a plate-shaped rectangular geometry. It comprises a plastic-like material and is designed so as to be shorter than the frame element 22. In each case said roof element 64 is connected to the flange 40a, 40b of the frame element 22 which is situated above the connectors when viewed in vertical direction z. To this effect the roof element 64 comprises a hole 68a, 68b each at its spaced-apart narrow sides 66a, 66b in the region of its longitudinal axis 67 that serves as a symmetry axis. The spacing between the holes 68a, 68b corresponds to a multiple of the spacing between the holes of the web-side perforation patterns 44a, 44b, and consequently the roof element 64 can be positioned as desired along the longitudinal axis 43 of the frame element 22 and thus in transverse direction y of the device 18.

Figure 9:
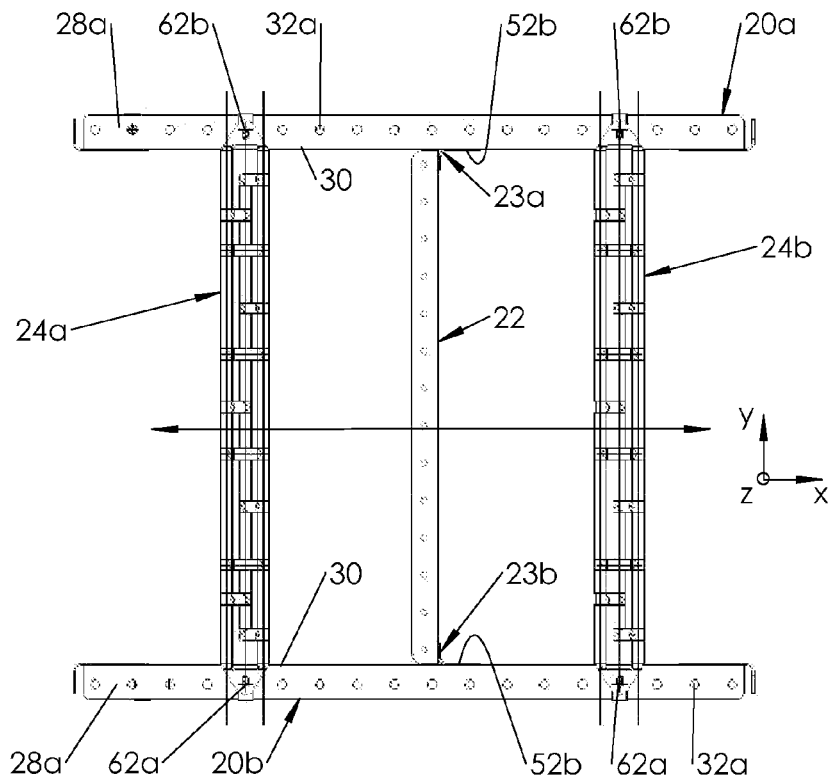

According to the double arrows in FIGS. 9 and 10, the frame element 22 and the lateral traverses 24a, 24b can be moved in longitudinal direction x and in vertical direction z of the device 18. In this arrangement the axial movement or the increment of movement in longitudinal direction x and in vertical direction z is determined by way of the distance between the individual holes of the perforation pattern or, in relation to the movement in the height of the lateral traverses, by way of the height of the traverse webs 30 or the spacing of the traverse flanges 28a, 28b from one another. The ability to move the frame element 22 is achieved by way of the web-side perforation pattern 32c of the traverses 20a, 20b in combination with the perforation pattern 54b of the connecting profiles 23a, 23b in the wide limb 52b. The ability to move the lateral traverses 24a, 24b is in each case achieved by way of the web-side perforation patterns 32a, 32b of the traverses 20a, 20b in combination with the elongated holes 62a, 62b of the lateral traverses 24, 24b.

Furthermore, as shown in FIG. 10, the device according to the invention 18 makes it possible to arrange additional system supports 70 for connecting electrical, hydraulic, pneumatic or other routes that cross the device 18. The system supports 70 are preferably not arranged on the flange 28a that is used by the lateral traverses 24a, 24b, but instead on the free lower flange 28b, as shown in the illustration, of the traverses 20a, 20b and are flexibly movable in longitudinal direction x of the traverses 20a, 20b by way of the perforation pattern 32b.

In particular, as shown as an example in the front views of FIGS. 11 to 14, because of the connecting profiles 23a, 23b the frame element 22 can be arranged in the middle of (FIG. 11), above (FIG. 12) and below (FIG. 13) the traverses 20a, 20b. In this arrangement the lateral traverses 24a, 24b are connected in a manner that corresponds to the arrangement of the frame element 22 in vertical direction z at the top flange 28a or at the bottom flange 28b of the traverses 20a, 20b.

Figure 14:
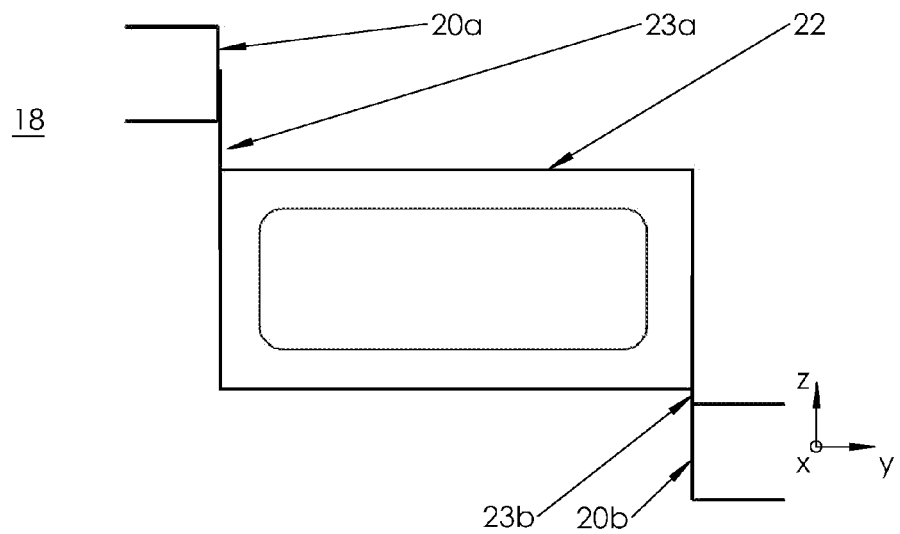

Furthermore, as shown as an example in FIG. 14, the connecting profiles 23a, 23b make it possible to move the traverses 20a, 20b in vertical direction z relative to one another so that steps in the primary structure can be compensated for. For example, according to the illustration in FIG. 14 the left-hand traverse 20a extends above the frame element 22, while the right-hand traverse 20b extends below the frame element 22.

In an exemplary installation method of the device 18 the traverses 20a, 20b are positioned parallel to one another on the cross members with flanges 28a, 28b that face away from one another, and by way of the angle profiles 26a, 26b, 26c, 26d are connected to the aforesaid. In this arrangement their spacing corresponds to the length of the frame element 22. Subsequently the frame element 22 with the preinstalled connector inserts or connectors is arranged between the traverses 20a, 20b, and in longitudinal direction x and vertical direction z is positioned according to specifications by way of the connecting profiles 23a, 23b. After this the lateral traverses 24a, 24b are attached to the flanges 28a, 28b at the desired lateral spacing from the frame element 22. Thereafter the roof element 64 is attached in its desired position to the flange 40a of the frame element 22. Finally, additional system supports 70 are installed on the traverses 20a, 20b.

In another method, preassembly of the device 18 takes place outside the aircraft. The routes are known so that the frame element 22 is attached, by way of the connecting profiles 23a, 23b, to the opposing webs 30 of the traverses 20a, 20b in their desired position. Furthermore, already one angle profile 26a, 26c has been connected to the traverses 20a, 20b in the region of the holes 36a, 36b. The frame element 22 comprises the corresponding connector inserts, and the roof element 64 has been installed. Likewise the lateral traverses 24a, 24b have already been attached to the traverse flanges 28a, 28b in their desired positions relative to the frame element 22. Thereafter, the device 18 is positioned between the cross members and is connected in the region of the elongated holes 38a, 38b by way of the two not-yet-installed angle profiles 26b, 26d, wherein component compensation and tolerance compensation takes place by means of the elongated holes 38a, 38b.

In an embodiment, the present invention provides a device for the mounting of connectors in an air, space, land or sea vehicle, wherein the device has connector-type components for the connection of a frame-type component for the accommodation of the connectors on beam-type components extending between structural sections of the vehicle, so that the components can be displaced at least relative to one another in the longitudinal and vertical directions.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE CHARACTERS

1 Device
2a, b Traverse
4 Frame element
6a, b, c, d Connecting plate
8 Traverse section
10 Recess
12 Insert
14a, b Lateral traverse
16a, b, c, d Console
18 Device
20a, b Traverse
22 Frame element
23a, 23b Connecting profile
24a, b Lateral traverses
26a, b, c, d Angle profile
28a, b Flange
30 Web
31 Symmetry axis
32a, b, c Perforation pattern
36a, b Hole
38a, b Elongated hole
40a, b Flange
42 Web
43 Longitudinal axis
44a, b, c, d Perforation pattern
45 Vertical axis
46 Recess
48a, b Hole line
50 Transverse axis
52a, b Limb
54a, b Perforation pattern
56a, b, c Rod-shaped element
58a, b, c, . . . . Web
59 Transverse axis
60a, b Lug
62a, b Elongated hole
64 Roof element 66a, b Narrow side
67 Longitudinal axis
68a, b Hole
70 System support

What is claimed is:

1. A device for mounting at least one connector in an aircraft fuselage comprising:
   a first and second traverse configured to connect the device to a structural section of the aircraft fuselage at end sections of the first and second traverses;
   a frame element extending traversely between the first and second traverses and configured to accommodate the at least one connector;
   a first and a second connecting profile respectively connecting the frame element to the first and second traverse;
   wherein the frame element and the first and second connecting profiles each have a perforation pattern configured to accommodate at least one attachment, and wherein the first and second traverses each include a C-shaped profile with a web, a first flange and a second flange, the web, the first flange and the second flange each having a perforation pattern extending along the entire length of the traverses such that the frame element is flexibly moveable in a longitudinal and vertical direction with respect to each of the traverses.

2. The device as recited in claim 1, wherein the first and second connecting profiles include an L-shaped profile, are configured to engage spaced apart edge regions of the frame element and are configured to engage a web of the first traverse and a web of the second traverse.

3. The device as recited in claim 1, wherein at least one of the end sections of the first and second traverses includes at least one elongated hole configured to accommodate an attachment configured to connect the device to the structural section of the aircraft fuselage.

4. The device as recited in claim 1, wherein the frame element includes at least one standard connecting region configured to accommodate at least one of a roof element and the at least one connector.

5. The device as recited in claim 1, further comprising at least one lateral traverse disposed on a side of the frame element so as to be movable in a longitudinal direction of the first and second traverses.

6. The device as recited in claim 5, wherein the at least one lateral traverse in connected to a flange of the first traverse and a flange of the second traverse.

7. The device as recited in claim 5, wherein the at least one of the first and second traverses, the frame element, the first and second connecting profiles, and the at least one lateral traverse include a respective body axis about which axis the at least one of the first and second traverses, the frame element, the first and second connecting profiles and the at least one lateral traverse is symmetrical.

8. The device as recited in claim 5, wherein the at least one lateral traverse includes one of a plastic material and a plastic alloy.

9. The device as recited in claim 1, wherein the first and second traverses, the frame element and the first and second connecting profiles are metallic.

* * * * *